United States Patent [19]
Christiansen et al.

[11] Patent Number: 6,049,763
[45] Date of Patent: Apr. 11, 2000

[54] METHOD AND APPARATUS FOR PERFORMING DIGITAL THERMAL ASPERITY DETECTION

[75] Inventors: Grant Stolpe Christiansen; Donald Earl Vosberg, both of Rochester, Minn.

[73] Assignee: International Business Machines Corporation, Armonk, N.Y.

[21] Appl. No.: 08/962,627

[22] Filed: Nov. 3, 1997

[51] Int. Cl.$^7$ ............... G11B 20/10; G11B 5/02
[52] U.S. Cl. ............... 702/133; 360/46; 360/51; 360/67; 360/75; 714/769; 714/799; 714/814; 714/819
[58] Field of Search ............... 702/133; 360/46, 360/51, 67, 75; 714/769, 799, 814, 819; 324/207.21

[56] References Cited

U.S. PATENT DOCUMENTS

| | | | |
|---|---|---|---|
| 5,233,482 | 8/1993 | Galbraith et al. | 360/46 |
| 5,751,510 | 5/1998 | Smith et al. | 360/67 |
| 5,844,920 | 12/1998 | Zook et al. | 714/769 |

OTHER PUBLICATIONS

Galbraith, R. L., et al., "Ditigal Thermal Asperity Detection", *IBM® Technical Disclosure Bulletin*, 34(6):338–339 (Nov. 1991), ©IBM Corp., 1991.

*Primary Examiner*—Marc S. Hoff
*Assistant Examiner*—Hien Vo
*Attorney, Agent, or Firm*—David W. Lynch

[57] ABSTRACT

An improved thermal asperity detector is disclosed for detecting short thermal asperities using a variable time threshold. The thermal asperity detector includes a saturation detector, and a comparator system. The comparator system may include a polarity latch, a processor, a level comparator and a timing comparator. The saturation detector compares a programmable saturation threshold to an A/D sample to generate an enable signal in response to the A/D sample exceeding the saturation threshold. The polarity latch receives the A/D sample and the enable signal, and records the most significant bit of the A/D sample to identify the polarity of the saturation and to provide an output signal representative thereof in response to the enable signal. The processor generates a threshold level control signal based upon a programmable level threshold and the polarity latch output signal. The level comparator compares the A/D sample and the output from the polarity latch in response to the enable signal, and generates a timing output signal to a timing comparator in response to the comparison of the A/D sample and the output from the polarity latch. The timing output signal represents a number of succeeding A/D samples that surpasses the dynamically shifted level threshold. The timing comparator compares the timing output signal from the level comparator and a programmable time threshold in response to the enable signal. Finally, the timing comparator generates a thermal asperity indication when the succeeding A/D samples surpass the dynamically shifted level threshold for the programmable time threshold.

29 Claims, 4 Drawing Sheets

METHOD AND APPARATUS FOR PERFORMING DIGITAL THERMAL ASPERITY DETECTION

BACKGROUND OF THE INVENTION

1. Field of the Invention

This invention relates in general to a thermal asperity detector, and more particularly to a thermal asperity detector that is able to detect short thermal asperities and which uses shorter time thresholds.

2. Description of Related Art

In data channel for a magnetoresistive (MR) sensor, a transient disturbance can result from a "thermal asperity". When a hard particle trapped on the surface of a magnetic disk collides with a MR sensor riding closely adjacent to the disk surface, a rapid temperature rise occurs in the sensor. This friction-created temperature increase of up to 120° C. first occurs at the point of contact between particle and MR sensor. The localized temperature increase produces a small but sudden increase in temperature of the entire MR sensor, perhaps as much as several centigrade degrees averaged over the whole sensor, within 50 to 100 nanoseconds. Because the MR sensor has a non-zero temperature coefficient of resistance (e.g. 0.003/° C. for permalloy), the sensor resistance then increases in response to the sudden temperature rise.

The heat conducted into the MR sensor from the localized hot spot diffuses slowly from the sensor to the local environment, causing the typical delayed exponential decay known for such thermal asperities. For instance, the increased sensor resistance can be seen to decline about 30% within the first one-half to five microseconds following collision.

Because the MR sensor detects magnetic signals by exploiting the magnetoresistive effect, resistance changes arising from magnetic changes on the disk surface adjacent to the sensor are detected as changes in voltage across the sensor. A DC bias current induces the voltage across the sensor resistance that varies according to changes in the sensor resistance. Thus, a thermal asperity induces a superimposed voltage transient on the desired data signal from the sensor. Because MR sensor non-linearity increases with increasing magnetic signal excursions about the sensor bias point, the sensor is designed to keep the magnetic excursions induced by desired data signals sufficiently small to ensure reasonable sensor linearity. For instance, detection of a magnetic change on the disk surface may require only a 0.3 percent change in sensor resistance. Thus, thermal asperity transients can exceed 400 percent of the typical base-to-peak magnetic data signal voltage amplitude from the MR sensor.

Thermal Asperity (TA) detectors are used to detect anomalies in a disk read signal that are caused by heating of the head's magnetoresistive sensor as it strikes a disk asperity. Previous thermal asperity (TA) detectors work well with large (in amplitude and duration) thermal asperities, but do not detect smaller asperities well. Previous detectors also have difficulty accurately detecting asperities when the signal rings after the overshoot caused by the low-frequency coupling pole.

One solution that has been used is described in IBM Technical Disclosure Bullet, entitled "Digital Thermal Asperity Detection", Vol. 34, No. 6, November 1991, pp. 338–9, hereby incorporated by reference, involves counting the number of samples that an asperity exceeds a threshold ("saturates"). If the count exceeds a given value, an asperity is declared. This method works well with large duration asperities, but not small, since the signal often decays too fast for more than one sample to saturate.

Another method that has been used is to declare a thermal asperity when the signal samples are either above a given threshold or below a given threshold for a given number of clock periods. This method has two disadvantages. First, the detection as implemented only detects in one direction (that is, it only detects either positive or negative thermal asperities). This precludes the detection of "cooling thermal asperities" that are of the opposite polarity than the ordinary "heating thermal asperities." Secondly, the method doesn't work for smaller thermal asperities because the threshold must be set below the partial-response maximum-likelihood (PRML) channels O's level, and DC erases (or long magnets) are detected as thermal asperities if the time threshold is set too low.

The increasing number of disk drive manufacturers that are using magnetoresistive heads in their drives need to detect thermal asperities during the manufacturing process to ensure that these disk defects are screened out. Detection of thermal asperities during a product's life can allow the drive to remap bad sectors before the loss of customer data.

It can be seen then that there is a need for a thermal asperity detector that tests a signal to see if the signal saturates for one sample before applying a level/time threshold to confirm the thermal asperity.

It can also be seen that there is a need for a thermal asperity detector that allows short thermal asperities to be detected by applying level/time thresholds after a potential asperity is seen.

It can also be seen that there is a need for a thermal asperity detector that allows for the use of shorter time thresholds.

It can also be seen that there is a need for a thermal asperity detector that saves power over prior methods by delaying the enablement of the level/time threshold circuit until after a saturated asperity has been detected.

SUMMARY OF THE INVENTION

To overcome the limitations in the prior art described above, and to overcome other limitations that will become apparent upon reading and understanding the present specification, the present invention discloses an improved thermal asperity detector.

The present invention solves the above-described problems by providing a thermal asperity detector that is able to detect short thermal asperities and which uses a variable time threshold.

A system in accordance with the principles of the present invention includes a saturation detector, a polarity latch, a processor, a level comparator and a timing comparator. The saturation detector receives an A/D sample and a programmable saturation threshold, wherein the programmable saturation threshold is compared to the A/D sample to generate an enable signal in response to the A/D sample exceeding the saturation threshold. The polarity latch receives the A/D sample and the enable signal, and the polarity latch in response to the enable signal records the most significant bit of the A/D sample to identify the polarity of the saturation and provides an output signal representative thereof. The processor processes a programmable level threshold and the output signal of the polarity latch and generates a threshold level control signal. The level comparator compares the A/D sample and the output from the polarity latch in response to the enable signal. The level threshold of the level comparator is dynamically shifted by the threshold level control signal from the processor and the level comparator generates a timing output signal to a timing comparator in response to the comparison of the A/D sample and the output from the polarity latch. The timing output signal represents a number of succeeding A/D samples that surpass the dynamically shifted level threshold. The timing comparator compares the timing output signal from the level comparator and a programmable time threshold in response to the enable signal. The timing comparator generates a thermal asperity indication when the succeeding A/D samples surpass the dynamically shifted level threshold for the programmable time threshold.

Other embodiments of a system in accordance with the principles of the invention may include alternative or optional additional aspects. One such aspect of the present invention is that the processor is an OR gate.

Another aspect of the present invention is that the saturation detector generates the enable signal for enabling the polarity latch, level comparator and timing comparator only after an A/D sample exceeds the programmable saturation threshold.

Another aspect of the present invention is that the programmable time threshold is varied to permit both long and short thermal asperities to be detected.

Yet another aspect of the present invention is that the enablement of the polarity latch, level comparator and timing comparator only after a saturate asperity has been detected minimizes power consumption.

Another aspect of the present invention is that the polarity latch records the most significant bit of the A/D sample to identify the polarity of the saturated sample.

Another aspect of the present invention is that the A/D sample is determined to be saturated when the A/D sample exceeds the programmable threshold in absolute value.

Still another aspect of the present invention is that the recorded polarity of the A/D sample is used to dynamically shift the level threshold to a given level or the negative of that level.

Another aspect of the present invention is that the thermal asperity is confirmed when the succeeding A/D samples exceed the dynamically shifted level threshold for the programmable time threshold in the case of a positive thermal asperity.

Another aspect of the present invention is that the thermal asperity is confirmed when the succeeding A/D samples are less than the dynamically shifted level threshold for the programmable time threshold in the case of a negative thermal asperity.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a thermal asperity detector that is able to detect short thermal asperities and which uses shorter time thresholds.

Figure 1:
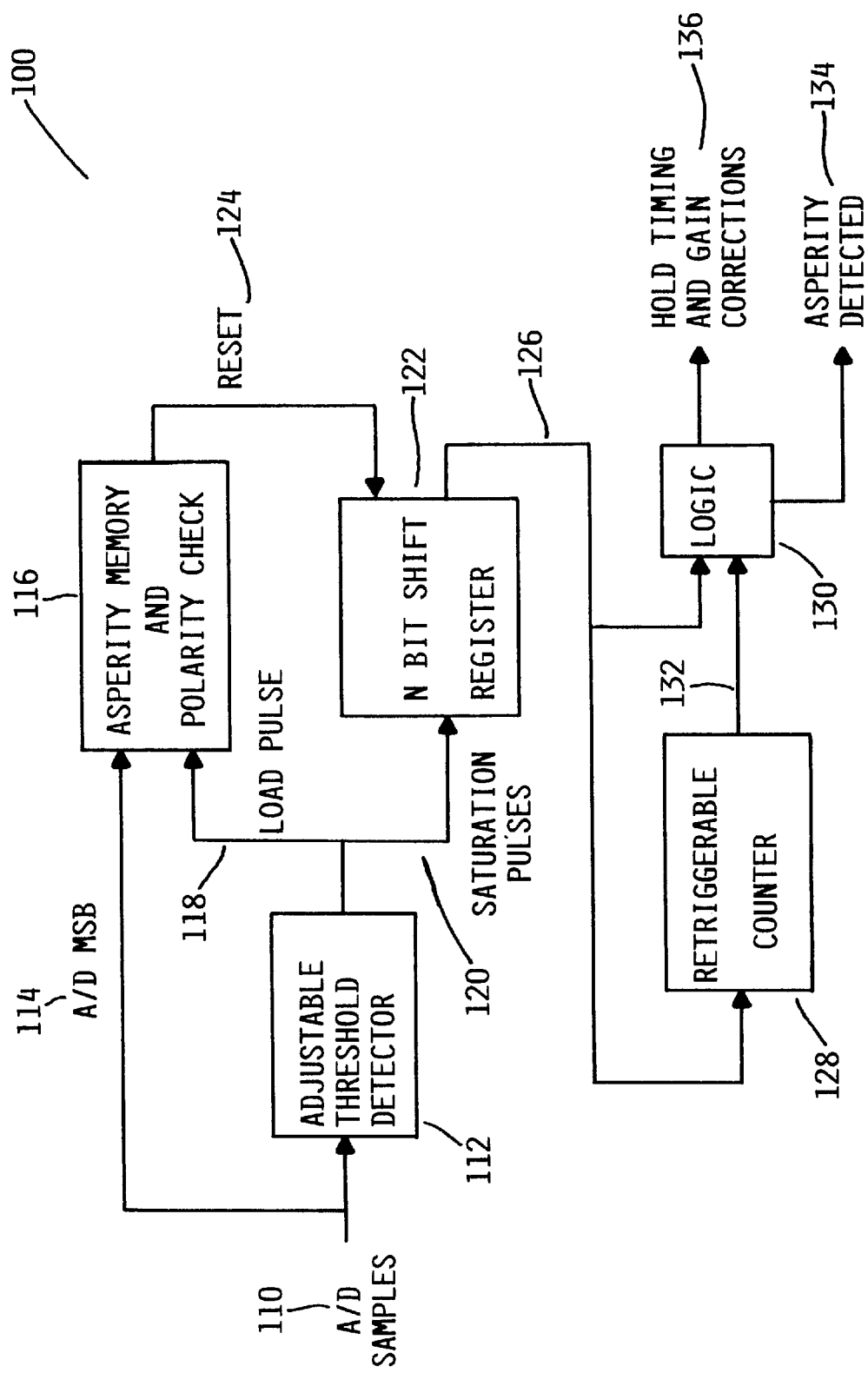
FIG. 1 illustrates a block diagram of a digital thermal asperity detector according to the prior art.

FIG. 1 illustrates a block diagram 100 of a digital thermal asperity detector according to the prior art. Analog-to-digital (A/D) samples 110 are received by an adjustable threshold detector 112. The most significant bit 114 of the analog-to-digital signal is provided to asperity memory and polarity checker 116. The adjustable threshold detector 112 provides a load pulse signal 118 to the asperity memory and polarity checker 116. The adjustable threshold detector 112 also provides saturation pulses 120 to an N bit shift register 122. The asperity memory and polarity checker 116 provides a reset signal 124 to the N bit shift register 122. In response, the N bit shift register 122 provides an output 126 to a retriggerable counter 128 and to a logic circuit 130. The output 132 of the retriggerable counter 128 is also provided to the logic circuit 130. The logic circuit 130 then determines whether an asperity is detected 134 and determines the hold timing and gain corrections 136.

In FIG. 1, the adjustable threshold detector 112 takes in the A/D samples 110 and senses whether the samples have saturated in either the positive or negative direction. The adjustable threshold detector 112 can be adjusted to accommodate changes in the A/D range. Changing the A/D range is used to minimize the impact of a thermal asperity on the recording channel. If one or more saturated samples are detected, one or more corresponding pulses 120 are outputted from the adjustable threshold detector 112. The saturation pulses 120 then tell the asperity memory and polarity checker 116 to latch and hold the A/D most significant bit 114. The A/D most significant bit 114 indicates the polarity of the thermal asperity.

The saturation pulses 120 also enter the N Bit shift register 122 which is used to validate the thermal asperity. If, before the saturation pulses 120 reaches the Nth cell of the shift register 122 and the A/D most significant bit changes state 114, an unexplained polarity change from the A/D samples is indicated, and the thermal asperity is invalid. The asperity memory and polarity checker 116 is used to indicate this change in polarity and will reset the shift register 122 causing no further processing of the saturation pulses 120. However, if the saturation pulses 120 reach the Nth cell of the shift register 122, this will start the retriggerable counter 128. The counter 128 will output an N bit pulse length which is used to hold the gain and timing corrections 136 of the recording channel during the thermal asperity. If the thermal asperity is relatively large, it will retrigger the counter 128 and hold the timing and gain corrections 136 longer. Also an asperity detected pulse 134 is outputted to indicate that a thermal asperity has been detected with the pulse length indicating the relative size of the thermal asperity. Eventually, the A/D most significant bit 114 will change state as the thermal asperity decays. The shift register 122 will reset and the counter 128 will continue to run for a fixed number of bit times marking the end of hold for the timing and gain corrections 136.

In FIG. 1, a read signal anomaly that is caused by an additive transient signal is defined in terms of the relative amplitude of the sample values 110 exiting an analog-to-digital (A/D) converter of a sampling detector. A sequence of sample values 110 are defined that are indicative of the effective samples that would be present for thermal (additive) transient of a specific amplitude. Since a thermal asperity causes a shift in the baseline of the read signal, at some thermal asperity amplitude, A/D samples 110 will saturate.

As the amplitude of the thermal asperity increases, the length of the saturated sample burst 120 also increases. The magnitude of a thermal asperity can then be categorized by the length of the burst of samples that contain saturated values. The thermal asperity magnitude that will be declared by the channel can be varied by varying the allowable length of the sample burst containing saturated values that can occur before declaring the anomaly a thermal asperity. If a small burst is required, then a relatively small amplitude thermal asperity will be sensed. This will also result in a higher probability of declaring a thermal asperity when the saturated sample values 120 were a result of some other effect. Conversely, a large thermal asperity declaration will more assuredly be correctly made if the allowable saturation burst 120 is long indicating a larger thermal asperity. The chances of this large burst being the result of some other effect other than a thermal asperity will be small. While this method works well with large duration asperities, small duration asperities pose a problem since the signal often decays too fast for more than one sample to saturate.

Figure 2:
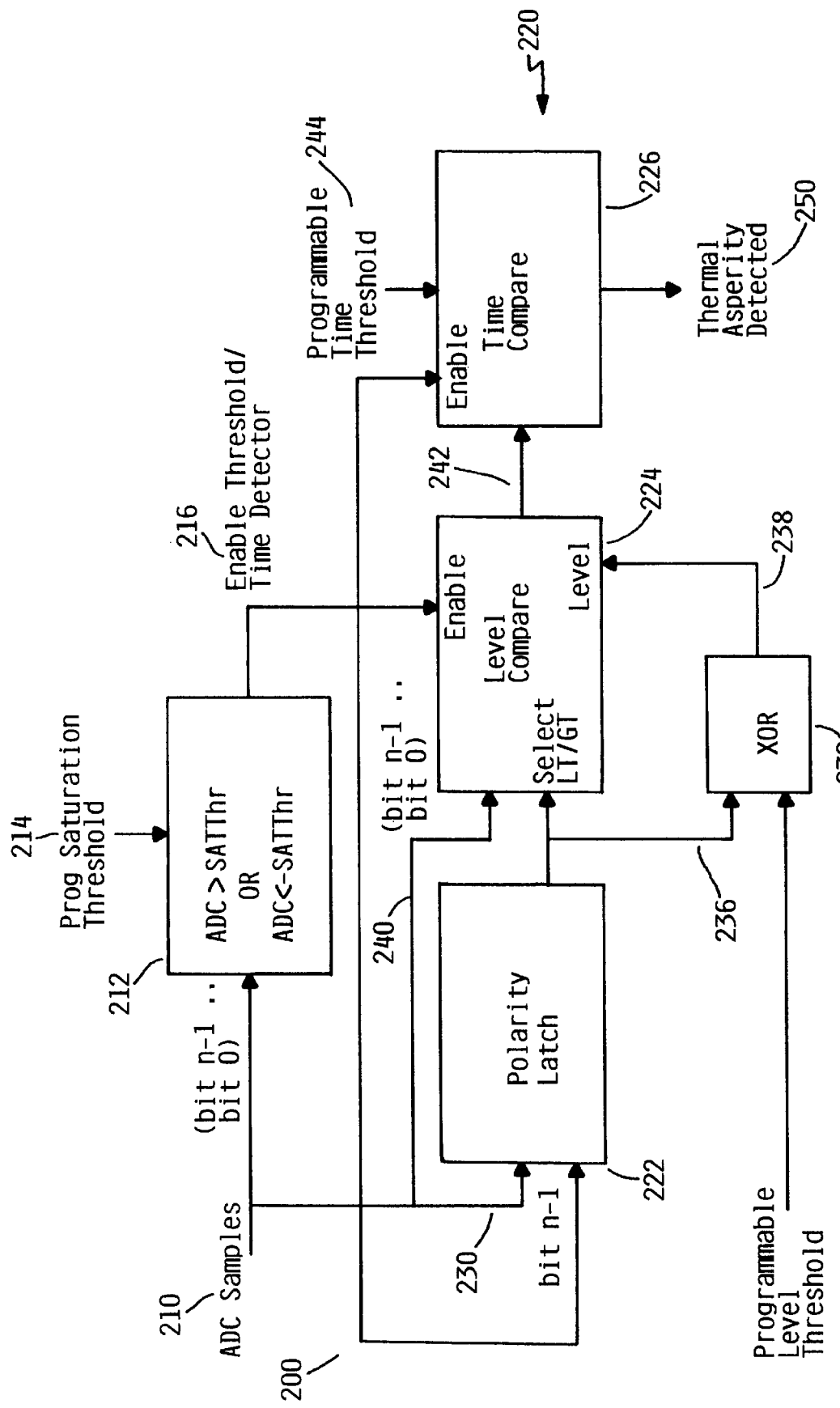
FIG. 2 illustrates a block diagram of a thermal asperity detector according to the present invention.

FIG. 2 illustrates a block diagram 200 of a thermal asperity detector according to the present invention. In FIG. 2, analog-to-digital samples 210 are received by a saturation detector 212. The saturation detector 212 also receives a programmable saturation threshold 214 for comparing the analog-to-digital sample to. The saturation detector 212 provides an enable threshold/time detector signal 216 for clocking a comparator system 220. As shown in FIG. 2, the enable threshold/time detector signal 216 clocks a polarity latch 222, a level comparator 224 and a time comparator 226. The analog-to-digital samples are received by the polarity latch 222 for recording the most significant bit 230 of the analog-to-digital sample for identifying the polarity of the saturation.

An exclusive OR gate 232 receives a programmable level threshold 234 and the output 236 of the polarity latch 222. The output 238 of the exclusive OR gate 232 is provided to the level comparator 224 as a level control signal. The level comparator 224 also receives the analog-to-digital samples 240 and the signal 236 from the polarity latch 222 for dynamically shifting the level threshold.

The level comparator 224 provides an output 242 to a time comparator 226. The time comparator 226 also receives the enable signal 216 from the saturation detector 212 and a programmable time threshold 244. Whenever the succeeding samples surpass the time threshold 244, a thermal asperity is indicated as detected 250.

Now, the functionality of the thermal asperity detector 200 of FIG. 2 will be explained. After a signal read from the arm electronics module is amplified and filtered, it is passed through an A/D converter to be processed by the read channel. The saturation detection block 212 of the thermal asperity detector examines the A/D signal 210 for a saturation, i.e., where the signal exceeds a programmable threshold 214 in absolute value. Until saturation is detected, the comparator system 220 is not clocked, minimizing the power dissipation of the thermal asperity detector.

When a saturation is detected, the polarity of the saturation is memorized by the polarity latch 222 storing the A/D converters most significant bit 230. The memorized polarity 236 is used to dynamically shift the level threshold 224, used by succeeding blocks in the detector, to either a given level or the negative of that level.

At this point, the comparator system 220 is enabled (clocked) 216 to confirm that a thermal asperity is occurring. A thermal asperity is confirmed when the succeeding samples exceed, in the case of a positive thermal asperity, or are less than, in the case of a negative thermal asperity, the dynamically shifted level threshold 224 for a programmable number of samples 224.

Figure 3:
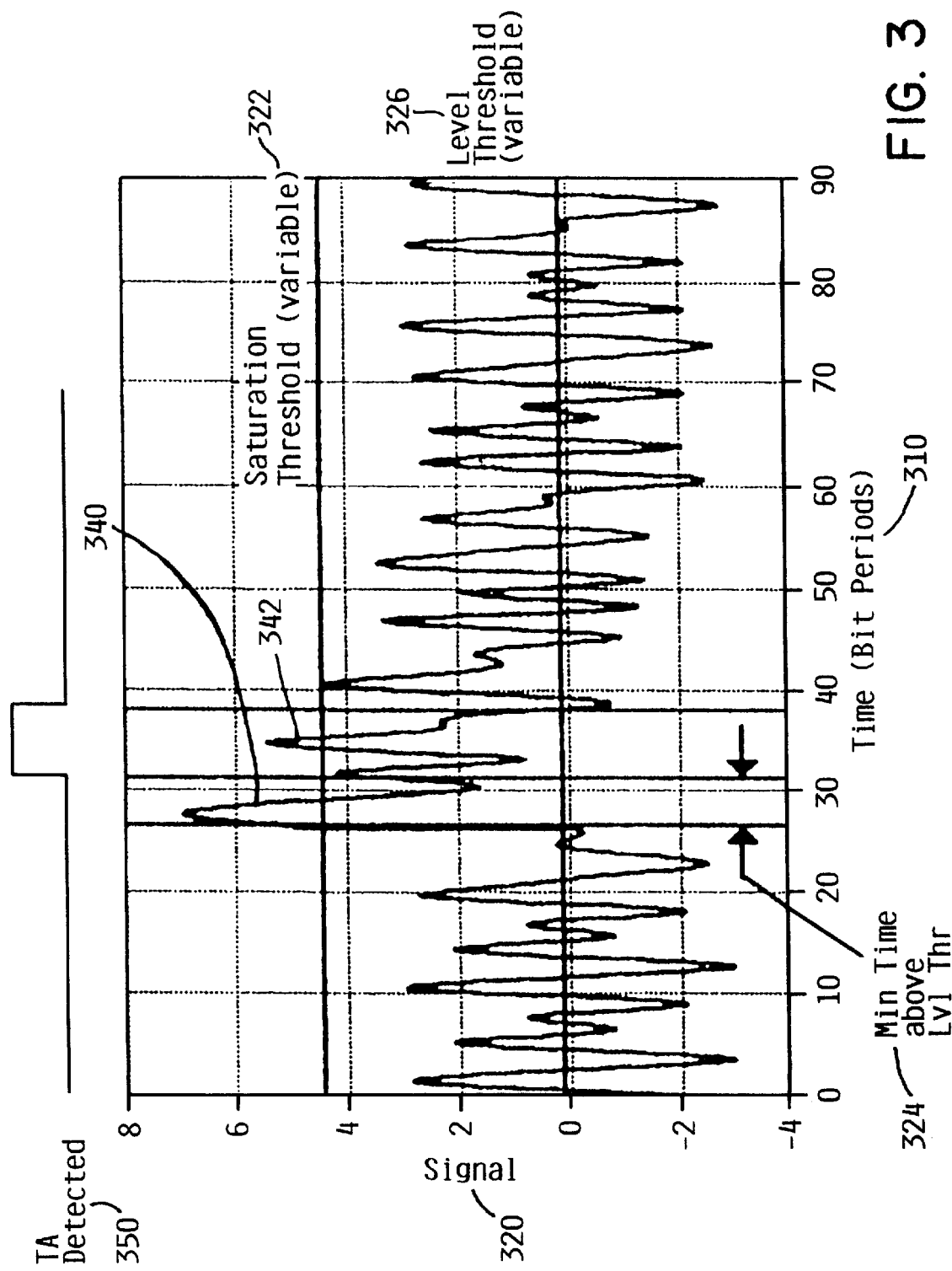
FIG. 3 illustrates the detection of a positive thermal asperity.

FIG. 3 is a graph 300 illustrating the detection of a positive thermal asperity. In FIG. 3, the x-axis 310 represent time in bit periods. The y-axis 320 represents the magnitude of the data channel signal. A saturation threshold 322 is selected for determining when the detected signal 340 represents a saturated signal. A programmable time threshold 324 is applied to detect if the signal 340 is saturated for a minimum time period. A level threshold 326 is applied for adjusting the average level threshold of the data channel signal 340. Thus, a thermal asperity 350 is confirmed when a succeeding sample 342 exceeds the saturation threshold 322.

Figure 4:
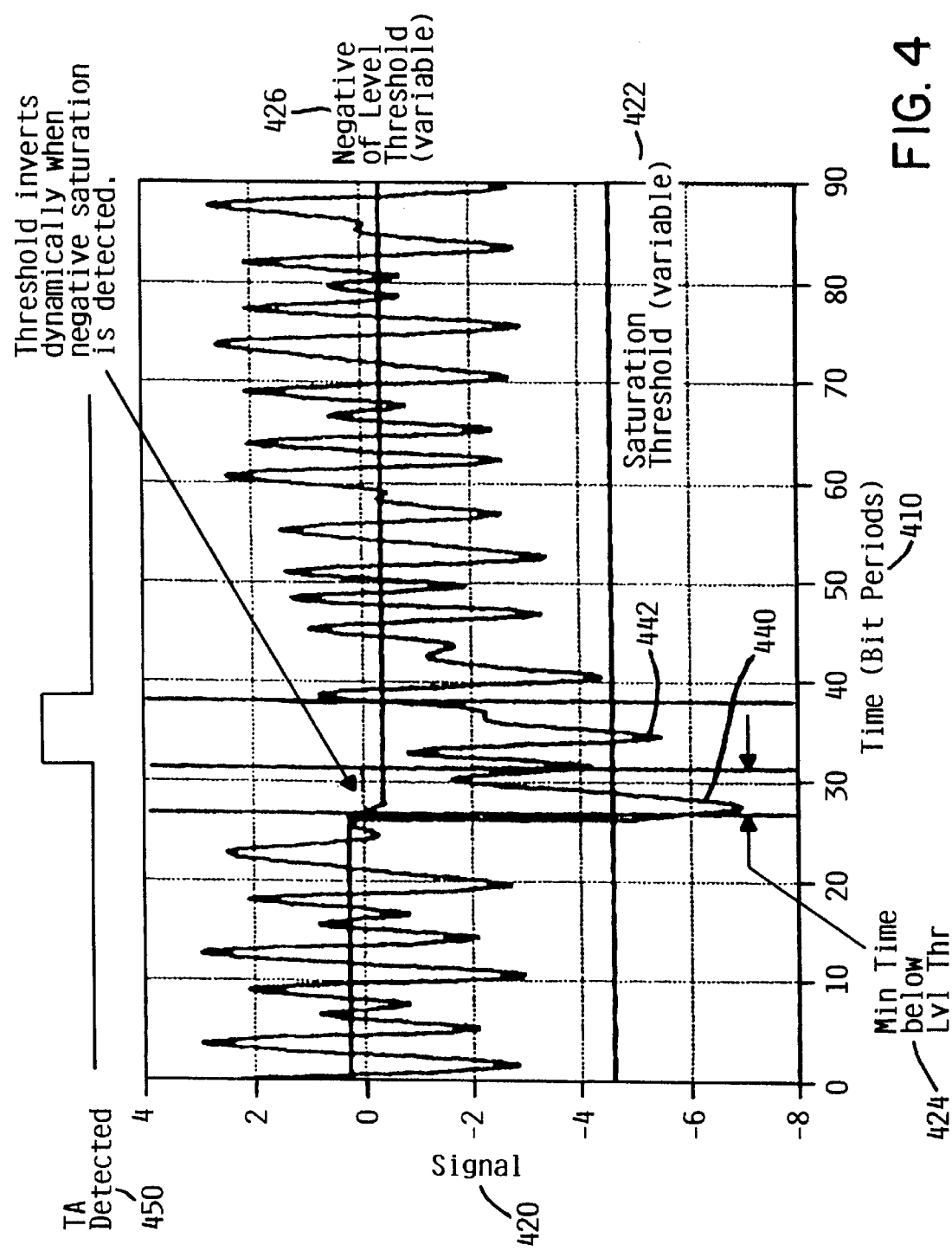
FIG. 4 illustrates the detection of a negative thermal asperity.

FIG. 4 is a graph illustrating the detection of a negative thermal asperity. Again, the x-axis 410 represent time in bit periods and the y-axis 420 represents the magnitude of the data channel signal. A negative saturation threshold 422 is selected for determining when the detected signal 440 represents a saturated signal. The programmable time threshold 424 is applied to detect when the signal 440 is saturated for a minimum time period. The negative of the level threshold 426 is applied for adjusting the average level threshold of the data channel signal 440. Thus, a thermal asperity 450 is confirmed when a succeeding sample 442 exceeds the saturation threshold.

In summary, a signal is tested to see if it saturates for one sample, and then a level/time threshold is applied to confirm the thermal asperity. This allows short thermal asperities to be detected because the level/time thresholds aren't applied until a potential asperity is seen, and shorter time thresholds can be used. This method also saves power because the level/time threshold circuitry that uses the most power isn't enabled until a potential (saturated) asperity is detected.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A thermal asperity detector, comprising:
   a saturation detector for receiving A/D samples and a programmable saturation threshold, the programmable saturation threshold being compared to the A/D samples and generating an enable signal in response to the A/D samples exceeding the programmable saturation threshold; and a comparator system, operatively coupled to the saturation detector, having a dynamically controllable level threshold and a programmable time threshold, the comparator system being enabled by the saturation detector for comparing the A/D samples to a level threshold to indicate a number of A/D samples after a first saturated A/D sample is detected that surpass the dynamically shifted level threshold and generating a thermal asperity indication when succeeding A/D samples surpasses the dynamically shifted level threshold for the programmable time threshold.

2. The thermal asperity detector of claim 1 further comprising a polarity latch, coupled to the saturation detector, for receiving A/D samples and the enable signal, the polarity latch in response to the enable signal recording the most significant bit of the A/D samples to identify the polarity of the saturation and providing an output signal representative thereof.

3. The thermal asperity detector of claim 2 further comprising a processor, coupled to the polarity latch, for processing a programmable level threshold and the output signal of the polarity latch and generating the threshold level control signal supplied to the comparator system.

4. The thermal asperity detector of claim 3 wherein the processor is an OR gate.

5. The thermal asperity detector of claim 1 wherein the saturation detector generates the enable signal for enabling the polarity latch, level comparator and timing comparator only after an A/D sample exceeds the programmable saturation threshold.

6. The thermal asperity detector of claim 1 wherein the programmable time threshold is varied to permit both long and short thermal asperities to be detected.

7. The thermal asperity detector of claim 1 wherein the enablement of the comparator system only after a saturated asperity has been detected minimizes power consumption.

8. The thermal asperity detector of claim 1 wherein an A/D sample is determined to be saturated when an A/D sample exceeds the programmable threshold in absolute value.

9. The thermal asperity detector of claim 1 wherein a thermal asperity is confirmed when the succeeding A/D samples exceed the dynamically shifted level threshold for the programmable time threshold in the case of a positive thermal asperity.

10. The thermal asperity detector of claim 1 wherein a thermal asperity is confirmed when the succeeding A/D samples are less than the dynamically shifted level threshold for the programmable time threshold in the case of a negative thermal asperity.

11. A thermal asperity detector, comprising:

a saturation detector for receiving an A/D sample and a programmable saturation threshold, the programmable saturation threshold being compared to the A/D sample and generating an enable signal in response to the A/D sample exceeding the programmable saturation threshold;

a polarity latch, coupled to the saturation detector, for receiving the A/D sample and the enable signal, the polarity latch in response to the enable signal recording the most significant bit of the A/D sample to identify the polarity of the saturation and providing an output signal representative thereof;

a processor, coupled to the polarity latch, for processing a programmable level threshold and the output signal of the polarity latch and generating a threshold level control signal;

a level comparator, coupled to the polarity latch, for comparing the A/D sample and the output from the polarity latch in response to the enable signal, the level threshold of the level comparator being dynamically shifted by the threshold level control signal from the processor, the level comparator generating a timing output signal to a timing comparator in response to the comparison of the A/D sample and the output from the polarity latch, the timing output signal representing a number of succeeding samples A/D samples that surpasses the dynamically shifted level threshold; and a timing comparator, coupled to the level comparator, for comparing the timing output signal from the level comparator and a programmable time threshold in response to the enable signal, the timing comparator generating a thermal asperity indication when the succeeding A/D samples surpasses the dynamically shifted level threshold for the programmable time threshold.

12. The thermal asperity detector of claim 11 wherein the processor is an OR gate.

13. The thermal asperity detector of claim 11 wherein the saturation detector generates the enable signal for enabling the polarity latch, level comparator and timing comparator only after an A/D sample exceeds the programmable saturation threshold.

14. The thermal asperity detector of claim 11 wherein the programmable time threshold is varied to permit both long and short thermal asperities to be detected.

15. The thermal asperity detector of claim 11 wherein the enablement of the polarity latch, level comparator and timing comparator only after a saturate asperity has been detected minimizes power consumption.

16. The thermal asperity detector of claim 11 wherein the polarity latch records the most significant bit of the A/D sample to identify the polarity of the saturated sample.

17. The thermal asperity detector of claim 11 wherein the A/D sample is determined to be saturated when the A/D sample exceeds the programmable threshold in absolute value.

18. The thermal asperity detector of claim 11 wherein the recorded polarity of the A/D sample is used to dynamically shift the level threshold to a given level or the negative of that level.

19. The thermal asperity detector of claim 18 wherein the thermal asperity is confirmed when the succeeding A/D samples exceed the dynamically shifted level threshold for the programmable time threshold in the case of a positive thermal asperity.

20. The thermal asperity detector of claim 18 wherein the thermal asperity is confirmed when the succeeding A/D samples are less than the dynamically shifted level threshold for the programmable time threshold in the case of a negative thermal asperity.

21. A method of indicating the detection of valid thermal asperities, comprising the steps of:

receiving A/D samples and a programmable saturation threshold at a saturation detector, determining whether the A/D sample is saturated by comparing the A/D sample to the programmable saturation threshold;

providing from the saturation detector an enable threshold/time detector signal for clocking a level comparator in response to the A/D sample being determined to be saturated;

receiving the A/D samples at a polarity latch for recording the most significant bit of the analog-to-digital sample to identify the polarity of the saturation and providing an output signal representative thereof;

processing a programmable level threshold and the output signal of the polarity latch and generating a level signal to a level comparator to dynamically shift the level threshold for the level comparator;

comparing at the level comparator the analog-to-digital samples and the output from the polarity latch for dynamically shifting the level threshold and generating a timing output signal to a time comparator;

comparing the timing output signal from the level comparator, the enable signal from the saturation detector and a programmable time threshold; and generating a thermal asperity indication when succeeding samples surpass the dynamically shifted level threshold for a programmable number of samples.

22. The method of claim 21 wherein the step of processing comprises the step of ORing the programmable level threshold and the output signal of the polarity latch.

23. The method of claim 21 wherein the step of providing from the saturation detector an enable threshold/time detector signal further comprises the step of clocking the polarity latch, level comparator and timing comparator only after an A/D sample exceeds the programmable saturation threshold.

24. The method of claim 23 wherein the enablement of the polarity latch, level comparator and timing comparator only after a saturate asperity has been detected minimizes power consumption.

25. The method of claim 21 further comprises the step of varying the programmable time threshold to permit both long and short thermal asperities to be detected.

26. The method of claim 21 wherein the step of determining whether the A/D sample is saturated further comprises the step of determining whether the A/D sample exceeds the programmable threshold in absolute value.

27. The method of claim 21 wherein the step of comparing at the level comparator the analog-to-digital samples and the output from the polarity latch further comprises the step of dynamically shifting the level threshold to a given level or the negative of that level.

28. The method of claim 27 wherein the step of generating a thermal asperity indication further comprises the step of confirming the thermal asperity when the succeeding A/D samples exceed the dynamically shifted level threshold for the programmable time threshold in the case of a positive thermal asperity.

29. The method of claim 27 wherein the step of generating a thermal asperity indication further comprises the step of confirming the thermal asperity when the succeeding A/D samples are less than the dynamically shifted level threshold for the programmable time threshold in the case of a negative thermal asperity.

* * * * *